(12) United States Patent
Fevrier et al.

(10) Patent No.: US 10,114,185 B2
(45) Date of Patent: Oct. 30, 2018

(54) SUBMARINE OPTICAL FIBER COMMUNICATIONS ARCHITECTURES

(71) Applicant: Facebook, Inc., Menlo Park, CA (US)

(72) Inventors: Herve Albert Pierre Fevrier, Redwood City, CA (US); Gayathrinath Nagarajan, Sunnyvale, CA (US); Stephen Gregory Grubb, Atherton, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/606,583

(22) Filed: May 26, 2017

(65) Prior Publication Data

US 2018/0203199 A1    Jul. 19, 2018

Related U.S. Application Data

(60) Provisional application No. 62/446,248, filed on Jan. 13, 2017.

(51) Int. Cl.
*G02B 6/44* (2006.01)

(52) U.S. Cl.
CPC ......... *G02B 6/4427* (2013.01); *G02B 6/4416* (2013.01)

(58) Field of Classification Search
CPC .................................................. G02B 6/4427
See application file for complete search history.

(56) References Cited

U.S. PATENT DOCUMENTS

| | | | | | |
|---|---|---|---|---|---|
| 5,995,259 | A | * | 11/1999 | Meli | H01S 3/06754 359/341.2 |
| 6,021,235 | A | * | 2/2000 | Yamamoto | H04B 10/2525 385/15 |
| 6,236,499 | B1 | * | 5/2001 | Berg | H04B 10/2918 359/341.2 |
| 6,894,830 | B2 | * | 5/2005 | Lee | H04B 10/297 359/337.2 |
| 7,512,343 | B2 | * | 3/2009 | Sridhar | H04B 10/25133 398/147 |

OTHER PUBLICATIONS

"Undersea Fiber Communication Systems, Edition 2," Academic Press, Edited by Jose Chesnoy, 2016, pp. 424-427, section 12.2.1 Optical Topology (within 12.2 repeaters).

* cited by examiner

*Primary Examiner* — Sung Pak
(74) *Attorney, Agent, or Firm* — Van Pelt, Yi & James LLP

(57) ABSTRACT

Submarine optical fiber communications are described. A submarine optical fiber communications system can be configured to transmit optical signals within a first band of the electromagnetic spectrum in a first direction, and to transmit optical signals within a second band of the electromagnetic spectrum in a second direction. The bands can be C band, L band, or both bands.

20 Claims, 9 Drawing Sheets

SUBMARINE OPTICAL FIBER COMMUNICATIONS ARCHITECTURES

CROSS REFERENCE TO OTHER APPLICATIONS

This application claims priority to U.S. Provisional Patent Application No. 62/446,248 entitled SUBMARINE OPTICAL FIBER COMMUNICATIONS ARCHITECTURES filed Jan. 13, 2017, which is incorporated herein by reference for all purposes.

TECHNICAL FIELD

This disclosure relates to architectures for submarine optical fiber communications.

BACKGROUND

Submarine communications cables can be laid in water, e.g. on the sea floor to provide long-distance communications between continents. For example, a submarine communications cable can include optical fibers to carry (or guide) optical signals representing data. The optical signals can be generated by transmitters converting electrical signal into pulses of light. As a result, an optical fiber of the submarine communications cable can guide an optical signal, or light, corresponding to a portion of the electromagnetic spectrum.

However, optical signals within different portions of the electromagnetic spectrum can interfere with each other, and therefore, a single optical fiber carrying multiple optical signals at different wavelengths (or portions of the electromagnetic spectrum) in the same direction can have issues resulting in needing a reduced span length. For example, optical signals can be provided in the C band or the L band of the electromagnetic spectrum and the optical signals among these different bands can interfere with each other. This results in an increase in a number of amplifiers used to transmit the data across the optical fibers of the submarine communications cable. As a result, the cost of developing and installing a submarine communications cable is increased.

Additionally, submarine communications cables are often designed to be symmetric, and therefore, sized based on the data capacity needed for the dominant direction in which more traffic is expected to be directed. This can also result in an increase in the cost of developing and installing the submarine communications cable.

DETAILED DESCRIPTION

Figure 1:
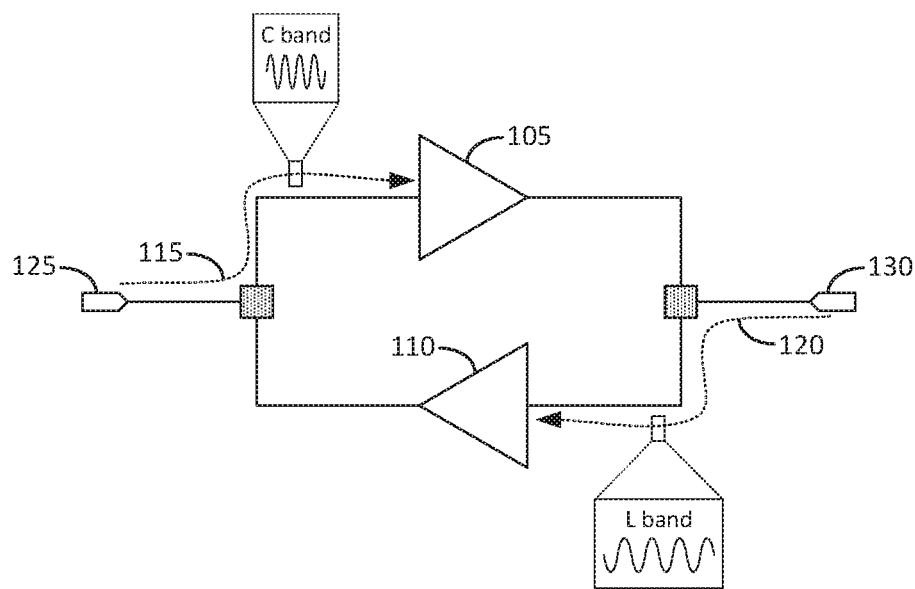
FIG. 1 illustrates an example of a bidirectional C band and L band submarine optical fiber communications system for a single optical fiber.

Some of the material described in this disclosure includes architectures for submarine optical fiber communications. In one example, a submarine optical fiber communications system can include one optical amplifier for optical signals within the C (or conventional) band (e.g., 1530 to 1565 nanometer (nm) wavelengths) and another optical amplifier for optical signals within the L (or long) band (e.g., 1565 to 1625 nm wavelengths). The optical amplifiers can be arranged such that they amplify and drive their corresponding optical signals in opposite directions. As a result, optical signals within the C band are carried, or guided, in optical fibers of the submarine optical fiber communications system in an opposing direction from optical signals within the L band. This results in a reduction of non-linear effects, for example, optical signals within the C band losing energy to optical signals in the L band if they are carried in the same direction. As a result, the cost per bit of the submarine optical fiber communications system can be reduced.

In another example, a submarine optical fiber communications system can include optical fibers arranged in pairs. Using the architecture described above, C band and L band optical signals can be carried in opposite directions. Additionally, the optical signals within the same band can be carried in opposite directions between the optical fibers in the pairs. For example, optical signals within the C band in one optical fiber can be carried west-to-east, but optical signals within the C band in the second optical fiber of the pair can be carried east-to-west.

In another example, a submarine optical fiber communications system can include an optical switch to configure the direction that optical signals are carried. For example, the submarine optical fiber communications system can carry optical signals within one range of the electromagnetic spectrum (e.g., wavelengths corresponding to the red portion within the C band) in one direction on an optical fiber. Based on the configuration of the optical switch, optical signals within another range of the electromagnetic spectrum (e.g., wavelengths corresponding to the blue portion within the C band) can be carried in either direction. As a result, some optical signals can be carried east-to-west or west-to-east based on the state of the optical switch, allowing for configurable provisioning of the resources of the submarine optical fiber communications system. This can reduce the cost per bit of the submarine optical fiber communications system and allow for more flexible designs. For example, the submarine optical fiber communications system can be asymmetric with a different number of optical fibers being used for carrying optical signals in the different directions.

Some of the subject matter described herein include a submarine optical fiber communications system configured to transmit optical signals within a first band of the electromagnetic spectrum in a first direction, and to transmit optical signals within a second band of the electromagnetic spectrum in a second direction, the first direction being different than the second direction, and the first band and the second band being different bands of an optical frequency range of the electromagnetic spectrum.

In some implementations, the submarine optical fiber communications system can include a first optical amplifier configured to receive a first optical signal within the first band and provide an amplified first optical signal in the first direction; and a second optical amplifier configured to receive a second optical signal within the second band and provide an amplified second optical signal in the second direction.

In some implementations, the first optical amplifier includes a first amplification medium, the second optical amplifier includes a second amplification medium, the first and second amplification mediums being different.

In some implementations, the submarine optical fiber communications system can include a first optical fiber configured to carry optical signals within the first band in the first direction, and the first optical fiber configured to carry optical signals within the second band in the second direction.

In some implementations, the submarine optical fiber communication system can include a second optical fiber configured to carry optical signals within the first band in the second direction, and the second optical fiber further configured to carry optical signals within the second band in the first direction.

In some implementations, one of the first band and the second band corresponds to C band, and the other corresponds to L band.

Some of the subject matter described herein also includes a method of carrying optical signals within a submarine optical fiber communications system including transmitting a first optical signal within a first band of the electromagnetic spectrum in a first direction; and transmitting a second optical signal within a second band of the electromagnetic spectrum in a second direction, the first direction being different than the second direction, and the first band and the second band being different bands of an optical frequency range of the electromagnetic spectrum.

In some implementations, the first optical signal and the second optical signal are transmitted on a first optical fiber.

In some implementations, the method includes transmitting a third optical signal within the first band in the second direction on a second optical fiber; and transmitting a fourth optical signal within the second band in the first direction on the second optical fiber.

In some implementations, the transmitting includes amplifying the first optical signal and the second optical signal, the amplifying of the first optical signal using a first amplification medium, the amplifying of the second optical signal using a second amplification medium, the first and second amplification mediums being different.

Some of the subject matter described herein also includes a submarine optical fiber communications system configured to transmit a first optical signal within a first portion of the electromagnetic spectrum in a first direction, and a second optical signal within a second portion of the electromagnetic spectrum in the first direction or the second direction based on a state of an optical switch.

In some implementations, the second optical signal propagates through the optical switch.

In some implementations, the first optical signal does not propagate through the optical switch.

In some implementations, one of the first portion or the second portion is a red portion of C band of the electromagnetic spectrum, and the other is a blue portion of C band of the electromagnetic spectrum.

In some implementations, one of the first portion or the second portion is C band and the other portion is L band.

In some implementations, the optical switch includes a first state and a second state, the optical switch in the first state configured to receive the second optical signal from a first terminal of a first optical splitter/combiner and provide the second optical signal to a second terminal of the first optical splitter/combiner, the optical switch in the second state configured to receive the second optical signal from a first terminal of a second optical splitter/combiner and provide the second optical signal to the second terminal of the first optical splitter/combiner.

Some of the subject matter described herein includes a method of transmitting optical signals within a submarine optical fiber communications system including determining characteristics of the submarine optical fiber communications system; configuring a state of an optical switch of the submarine optical fiber communications system from a first state to a second state based on the determined characteristics; and adjusting transmission direction of optical signals within a first portion of the electromagnetic spectrum from a first direction to a second direction based on the state of the optical switch.

In some implementations, the characteristics include an increase in data in the second direction.

In some implementations, the method can include transmitting optical signals within a second portion of the electromagnetic spectrum in the first direction, wherein the optical signals within the second portion are also transmitted in the first direction when the state of the optical switch is in the first state or the second state.

In some implementations, one of the first portion or the second portion is a red portion of C band of the electromagnetic spectrum, and the other is a blue portion of C band of the electromagnetic spectrum.

In some implementations, one of the first portion or the second portion is C band and the other portion is L band.

In more detail, submarine optical fiber communications systems can include optical fibers and components (e.g., amplifiers, combiners/splitters, switches, etc.) laid down on the sea floor to provide communications across long distances. The communications can be provided by using optical signals (e.g., light) representing data that can be transmitted by being carried by the optical fibers implementing optical waveguides. The optical signals can be at optical frequency ranges within the C band (e.g., optical signals having wavelengths between 1530 to 1565 nm) or L band (e.g., optical signals having wavelengths between 1565 to 1625 nm). The C band can also be characterized by separate red and blue portions (e.g., sub-bands) within its band, or region of the electromagnetic spectrum.

FIG. 1 illustrates an example of a bidirectional C band and L band submarine optical fiber communications system for a single optical fiber. In FIG. 1, C band optical amplifier 105 and L band optical amplifier 110 can include different optical amplification mediums that amplify optical signals within different portions of the electromagnetic spectrum. Additionally, C band optical amplifier 105 and L band optical amplifier 110 are arranged such that they provide optical signals in opposite directions.

For example, C band optical amplifier 105 receives an optical signal from terminal 125 (e.g., received from an optical fiber) to be amplified and transmitted to an optical fiber via terminal 130. By contrast, L band optical amplifier 110 receives an optical signal from terminal 130 to be amplified and transmitted via terminal 125. Because the optical amplifiers are operational only within a particular band of the electromagnetic spectrum due to the different amplification mediums (e.g., either C band or L band signals are propagated through), this results in C band optical signal 115 being transmitted in a direction (e.g., west-to-east, or from terminal 125 to terminal 130) that is different than L band optical signal 120 (e.g., east-to-west, or from terminal 130 to terminal 125). Accordingly, in a single optical fiber of the submarine optical fiber communications system, optical signals within the C band are carried or guided in an opposite direction than optical signals within the L band. That is, optical signals within the C band and L band do not co-propagate in the same direction within the same optical fiber.

In some implementations, the amplification medium for C band optical amplifier 105 can be erbium such that C band optical amplifier 105 to implement an erbium doped fiber amplifier (EDFA). The amplification medium for L band optical amplifier 110 can also be erbium to implement an EDFA, but C band optical amplifier 105 and L band optical amplifier 110 can be doped with erbium differently (e.g., different concentrations), include different erbium doped fiber lengths (e.g., L band optical amplifier 110 having a longer length than C band optical amplifier 105), etc. such that the different types of optical amplifiers use different amplification mediums for their respective optical signals.

Carrying optical signals within the C band in a different direction than optical signals within the L band can result in a reduction of non-linear effects due to the interactions between optical signals at different bands propagating in the same direction within the same optical fiber. For example, optical signals within the C band can lose energy to optical signals within the L band if they are carried in the same direction within the same optical fiber. Additionally, because optical signals are modulated to carry information, some of the modulation on the optical signals of the C band can show on the optical signals within the L band. As a result, if optical signals within the C band and the L band travel in the same direction of the same optical fiber, the cost of the development of a submarine optical fiber communications system is increased. By contrast, if optical signals within the C band and the L band travel in different directions within the same optical fiber as described in FIG. 1, the cost can be decreased, for example, by increasing span length between amplifiers and reducing the number of amplifiers used to transmit the data across the optical fibers of the submarine communications cable.

Figure 2:
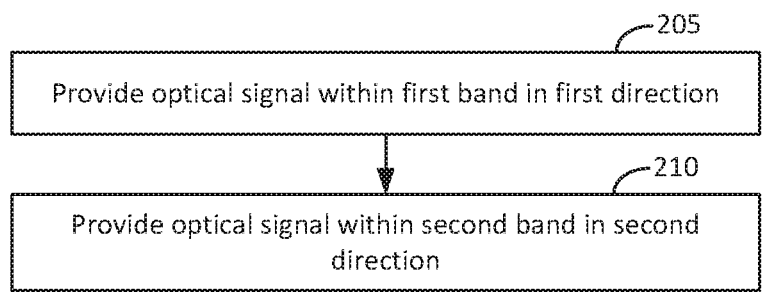
FIG. 2 illustrates a block diagram of providing bidirectional C band and L band optical fiber communications for a single optical fiber.

FIG. 2 illustrates a block diagram of providing bidirectional C band and L band optical fiber communications for a single optical fiber. In FIG. 2, at block 205, an optical signal within a first band of the electromagnetic spectrum can be provided in a first direction. For example, in FIG. 1, C band optical signal 115 can be provided from terminal 125 to C band optical amplifier 105 to be amplified and provided to terminal 130 so that it can be propagated in the west-to-east direction of an optical fiber.

At block 210, an optical signal within a second band of the electromagnetic spectrum can be provided in a second direction. The second direction can be different than the first direction. For example, in FIG. 1, L band optical signal 120 can be provided from terminal 130 to L band optical amplifier 110 to be amplified and provided to terminal 125 so that it can be propagated in the east-to-west direction of the optical fiber. As a result, optical signals within the C band are carried within an optical fiber in an opposing direction than optical signals within the L band.

In some implementations, optical fibers are arranged within submarine optical fiber communications systems to operate in pairs. For example, one optical fiber in the pair can be used to carry optical signals east-to-west and another optical fiber in the pair can be used carry optical signals east-to-west.

Figure 3:
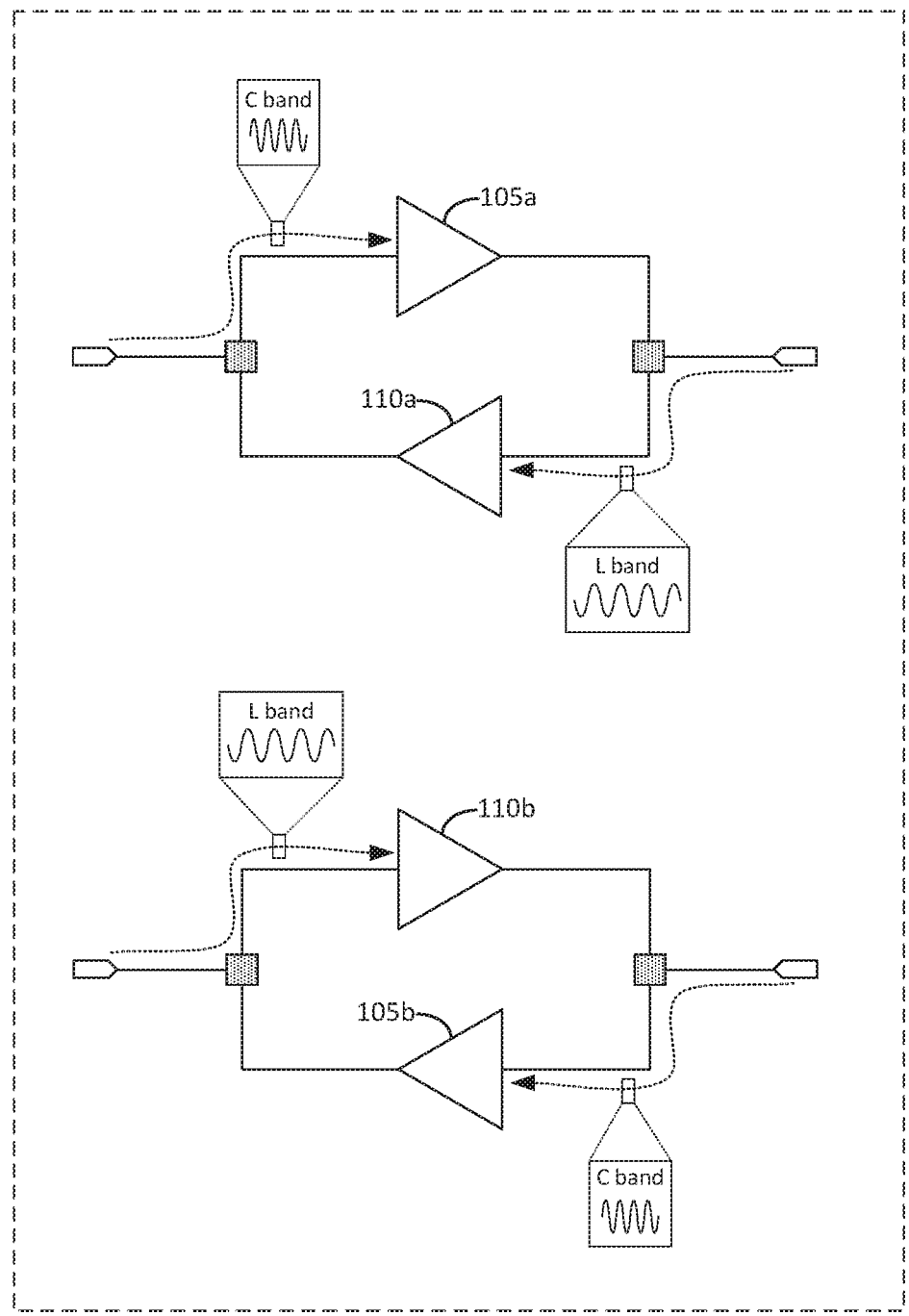
FIG. 3. illustrates providing bidirectional C band and L band optical fiber communications for an optical fiber pair.

FIG. 3. illustrates providing bidirectional C band and L band optical fiber communications for an optical fiber pair. In FIG. 3, C band optical amplifier 105a and L band optical amplifier 110a provide C band and L band optical signals, respectively, for one fiber of the optical fiber pair. Similarly, C band optical amplifier 105b and L band optical amplifier 110b provide C band and L band optical signals, respectively, for the second optical fiber of the optical fiber pair.

However, with the arrangement of the optical amplifiers in FIG. 3, optical signals within the same bands are carried in different directions among the different optical fibers of the optical fiber pair. For example, in FIG. 3, C band optical amplifier 105a is configured such that C band optical signals are carried west-to-east within a first optical fiber of the pair. By contrast, C band optical amplifier 105b is configured such that C band optical signals are carried east-to-west within the second optical fiber of the pair. That is, optical signals within the C band are carried in opposite directions among the two optical fibers of the pair.

Likewise, optical signals within the L band are also carried in different directions between the optical fibers in the pair. For example, in FIG. 3, L band optical amplifier 110a provides optical signals from east-to-west. By contrast, L band optical amplifier 110b provides optical signals from west-to-east.

The arrangement of FIG. 3 allows for an optical fiber pair to have the reduction in non-linear effects and costs as described previously. Moreover, the optical fiber pair can include optical signals within the C band and the L band carried in both directions, increasing data capacity.

In some scenarios, submarine communications cables are often designed to be symmetric and based on the data capacity needed for the dominant direction in which traffic is expected. For example, if six optical fibers are needed to provide the data capacity in the west-to-east direction then six optical fibers are also usually used to provide data capacity in the east-to-west direction. The direction of these optical fibers is generally fixed. That is, the transmission of optical signals is not adjusted such that it can switch from west-to-east to east-to-west within the same optical fiber. This can result in an increase in the cost of developing and installing the submarine communications cables. Additionally, because the direction of how the optical fibers are to carry optical signals is fixed, the system cannot be adjusted to reflect changing traffic patterns between the directions.

Figure 4:
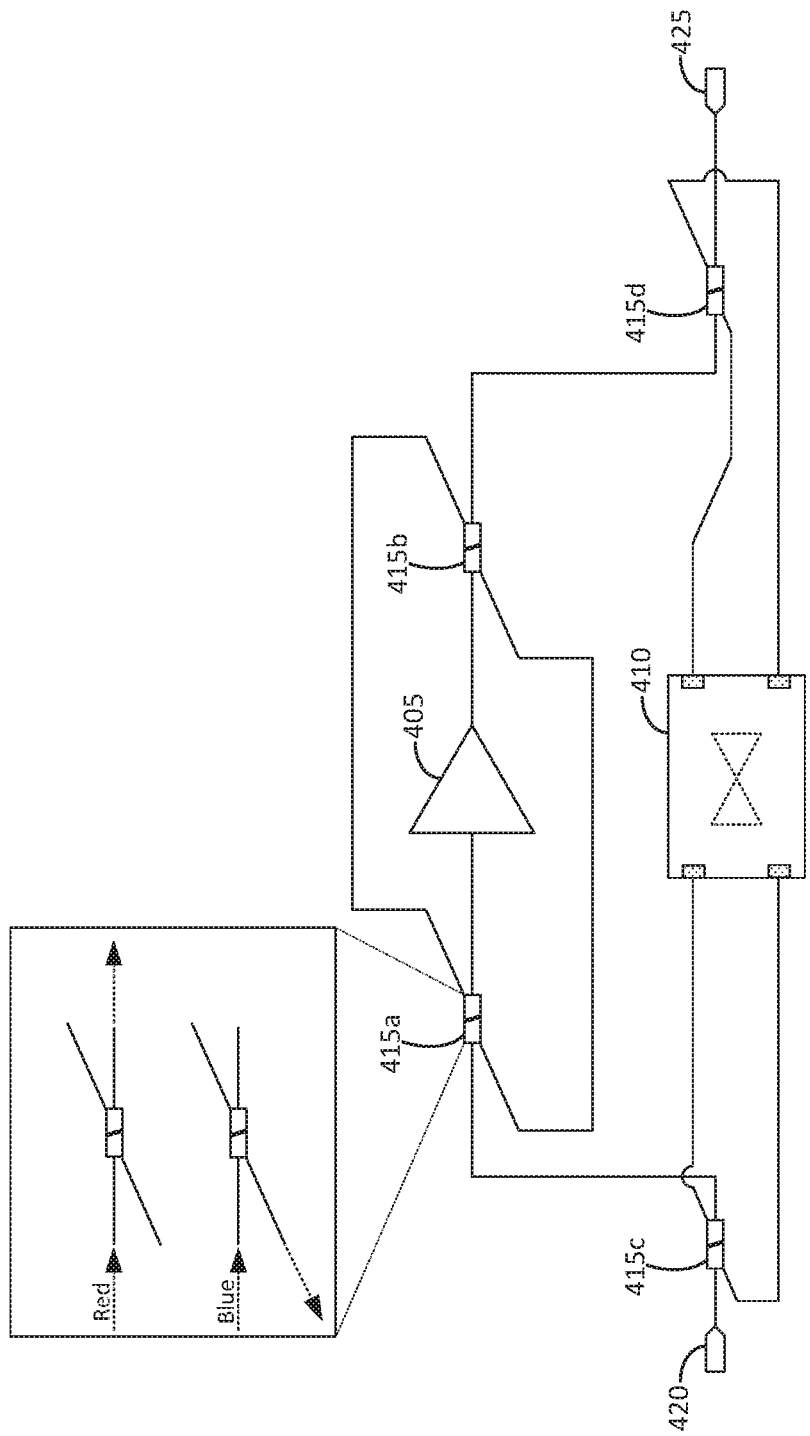
FIG. 4 illustrates an example of a configurable optical fiber communications system.

FIG. 4 illustrates an example of a configurable optical fiber communications system. In FIG. 4, amplifier 405, optical switch 410, and optical splitter/combiners 415a-d are arranged such that optical signals within one portion of the electromagnetic spectrum can be propagated from terminal 420 to terminal 425 (e.g., west-to-east). However, another portion of the electromagnetic spectrum can be propagated from terminal 420 to terminal 425, or terminal 425 to terminal 420 based on the state of optical switch 410. As a result, some optical signals can be carried east-to-west or west-to-east based on the state of optical switch 410, allowing for configurable provisioning of some of the resources of the submarine optical fiber communications system. This can reduce the cost per bit of the submarine optical fiber communications system and allow for more flexible designs. For example, the submarine optical fiber communications system can be asymmetric with a different number of optical fibers being used for carrying optical signals in the different directions.

In FIG. 4, optical splitter/combiners 415a-d can be components such as filters that separate the red and blue portions of the C band and provide the corresponding red and blue portions to different outputs. For example, in FIG. 4, optical splitter/combiner 415a can receive a red optical signal and pass-through the red optical signal, or provide it to a pass-through terminal. By contrast, as depicted in FIG. 4, if a blue optical signal is received, it is reflected, or provided to a reflected terminal. That is, red and blue portions of the C band are provided at different outputs of optical splitter/combiner 415a even though they are provided to the same input. If the optical signal is provided from the other side, then the red optical signals would propagate from right-to-left (in contrast to the left-to-right propagation depicted in FIG. 4) and blue optical signals would propagate from right-to-top-right (due to being provided to the reflected terminal).

Amplifier 405 is a simplified representation of one or more amplifiers that can amplify the red and blue optical signals within the C band. Optical switch 410 is a 2×2 optical switch that can be configured to be in a "bar-state" in which its terminals are coupled together such that the interconnects coupled with optical splitter/combiner 415c and the terminals of optical switch 410 are coupled together, or in a "cross-state" in which the interconnects coupled with optical splitter/combiners 415c are coupled with optical splitter/combiners 415d, as discussed in more detail below. With the arrangement of the components as depicted in FIG. 4, the red optical signals within the C band propagate from terminal 420 to terminal 425 without propagating through optical switch 410, and therefore, red optical signals within the C band are carried by the corresponding optical fiber in the west-to-east direction. By contrast, blue optical signals within the C band can propagate from terminal 425 to terminal 420, or terminal 420 to terminal 425 based on whether optical switch 410 is in the bar-state or cross-state because blue optical signals propagate through optical switch 410. As a result, blue optical signals can be carried west-to-east or east-to-west on the same optical fiber by changing the state of optical switch 410.

Figure 5:
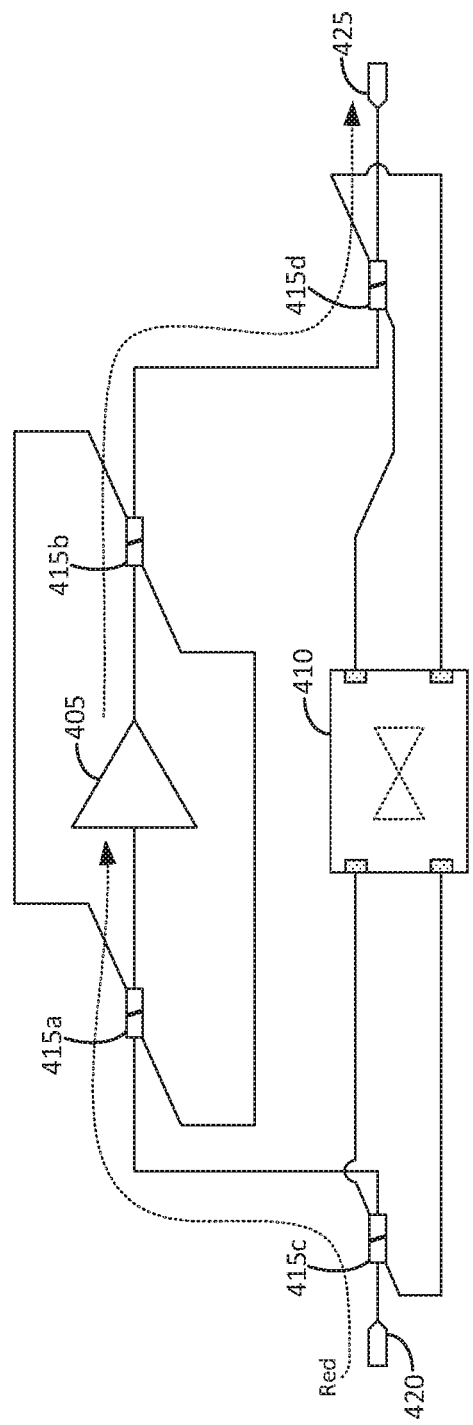
FIG. 5 illustrates an example of an optical signal propagating through the configurable optical fiber communications system.

For example, FIG. 5 illustrates a red optical signal within the C band propagating through the configurable optical fiber communications system. In FIG. 5, the red optical signal is received at terminal 420 and is provided to optical splitter/combiner 415c. As previously discussed, red optical signals are passed-through by optical splitter/combiners 415a-d, and therefore, it is subsequently provided to optical splitter/combiner 415a. Again, the red optical signal is passed-through and provided to amplifier 405. The red optical signal can be amplified and then provided to optical splitter/combiner 415b, where it is passed-through again as depicted and provided to optical splitter/combiner 415d before being passed through a final time to terminal 425. As a result, red optical signals within the C band provided at terminal 420 propagate to terminal 425 such that they can be carried west-to-east on an optical fiber.

Figure 6:
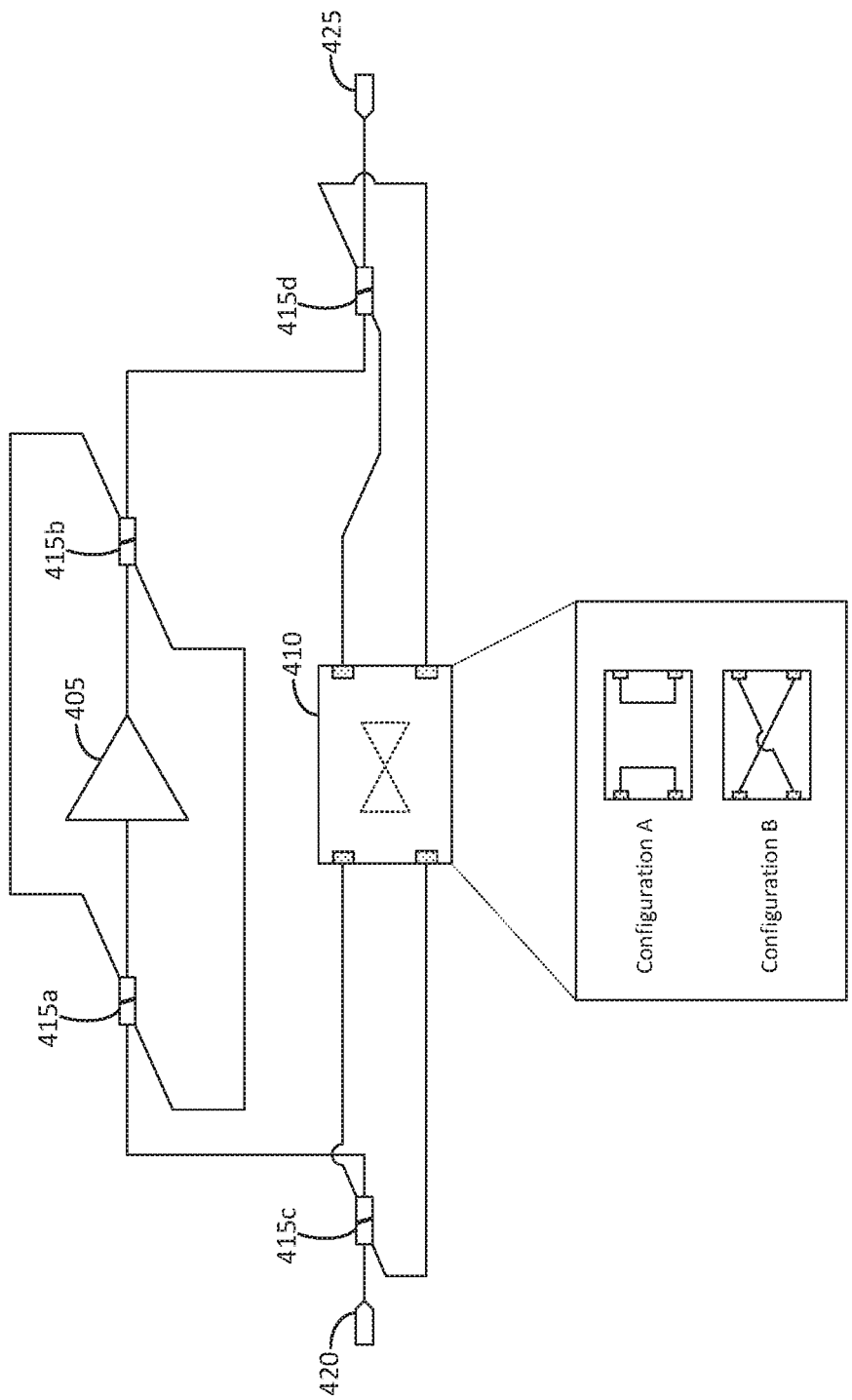
FIG. 6 illustrates an example of the configurations of an optical switch of the configurable optical fiber communications system.

By contrast, blue optical signals can propagate from terminal 420 to terminal 425, or terminal 425 to terminal 420 based on the state of optical switch 410 such that blue optical signals can be carried west-to-east or east-to-west. For example, FIG. 6 illustrates the configurations of an optical switch of the configurable optical fiber communications system. In FIG. 6, optical switch 410 can be in the bar-state (labeled as Configuration A in FIG. 6) or the cross-state (labeled as Configuration B). The four terminals of optical switch 410 are coupled differently based on the state of optical switch 410. The different couplings of the terminals of optical switch 410 results in blue optical signals being propagated differently.

Figure 7:
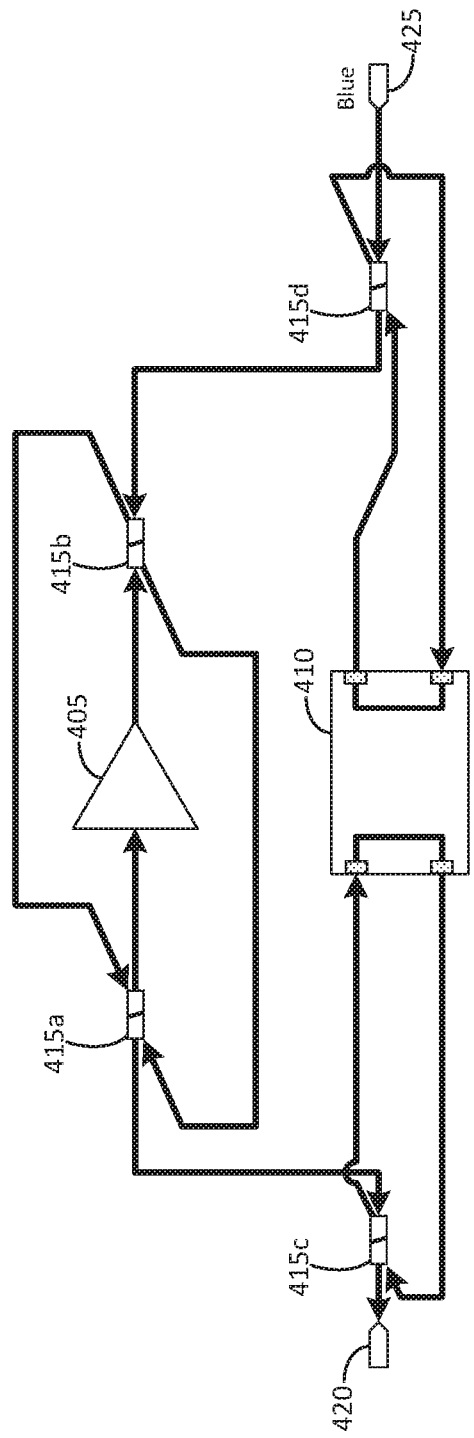
FIG. 7 illustrates an example of an optical signal propagating through a configuration of the optical switch of the configurable optical fiber communications system.

FIG. 7 illustrates an example of an optical signal propagating through the optical switch of the configurable optical fiber communications system in the bar-state. In FIG. 7, a blue optical signal is provided at terminal 425 and is propagated to terminal 420 to be carried in the east-to-west direction of an optical fiber. For example, the blue optical signal is provided to optical splitter/combiner 415d and reflected towards one of the terminals of optical switch 410. Because optical switch 410 is in the bar-state, this results in the blue optical signal being provided to another terminal of optical splitter/combiner 415d and reflected to optical splitter/combiner 415b. Next, the blue optical signal is reflected again to optical splitter/combiner 415a before it is reflected again and provided to amplifier 405. The amplified blue optical signal is then provided to optical splitter/combiner 415b where it is reflected again to optical splitter/combiner 415a. Subsequently, it is reflected again to optical splitter/combiner 415c, which in turn reflects it again to another terminal of optical switch 410. Because optical switch 410 is in the bar-state, the blue optical signal is provided to another terminal of optical splitter/combiner 415c, where it is finally reflected and provided at terminal 420. As a result, if optical switch 410 is in the bar-state, blue optical signals provided at terminal 425 is provided to terminal 420 such that it can be carried west-to-east in an optical fiber.

Figure 8:
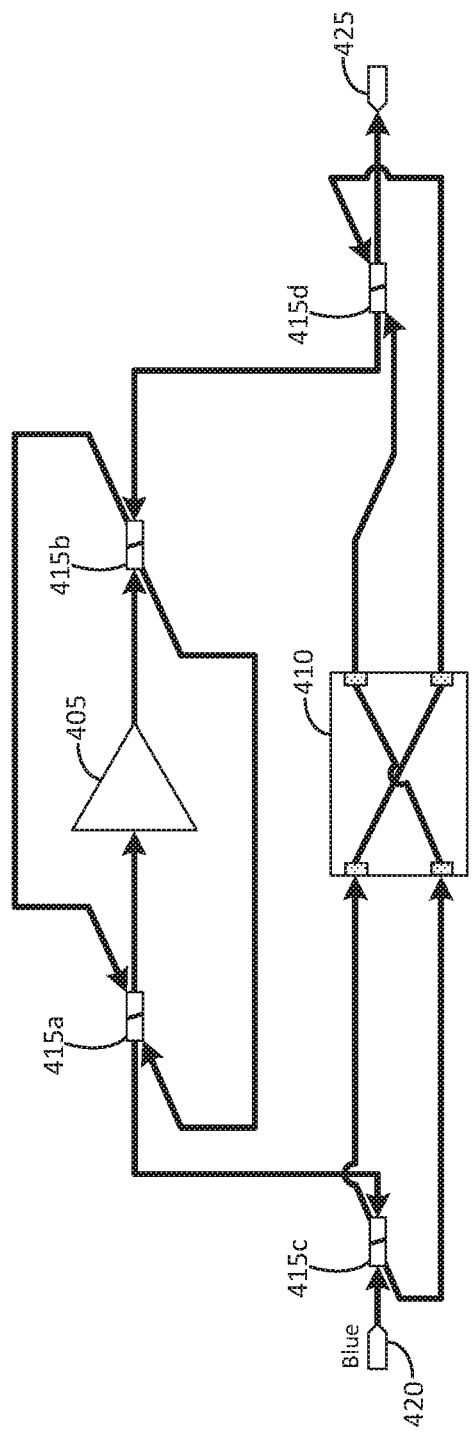
FIG. 8 illustrates an example of an optical signal propagating through another configuration of the optical switch of the configurable optical fiber communications system.

FIG. 8 illustrates an example of an optical signal propagating through the optical switch of the configurable optical fiber communications system in the cross-state. In FIG. 8, a blue optical signal is provided at terminal 420 and is propagated to terminal 425 to be carried in the west-to-east direction of an optical fiber. For example, the blue optical signal provided at terminal 420 is provided to optical splitter/combiner 415c and reflected to one of the terminals of optical switch 410. Because optical switch 410 is in the cross-state, the blue optical signal is propagated through optical switch 410 to an output coupled with optical splitter/combiner 415d. The blue optical signal is reflected to optical splitter/combiner 415b, reflected to optical splitter/combiner 415a, reflected to amplifier 405 and provided to optical splitter/combiner 415b again. It is reflected again to optical splitter/combiner 415a and reflected back to optical splitter/combiners 415c, which reflects it to another terminal of optical switch 410. Because optical switch 410 is in the cross-state, the blue optical signal is provided to another terminal of optical switch 410 and onward to optical splitter/combiner 415d where it is reflected a final time to terminal 425. As a result, if optical switch 410 is in the cross state, blue optical signals provided at terminal 420 is provided to terminal 425 such that it can be carried east-to-west in an optical fiber.

Configuring optical switch 410 of the optical fiber communications system to propagate optical signals in different directions can result in an asymmetric optical fiber communications system with a different number of optical fibers being used for carrying optical signals in different directions. This can reduce the cost per bit of the optical fiber communications system because fewer optical fibers can be used. Additionally, this allows for provisioning the resources of the optical fiber communications system based on the characteristics of the data carried on the fiber. For example, if the dominant direction of the data changes, then optical switch 410 can be adjusted such that an optical signal can be provided in the new dominant direction.

Figure 9:
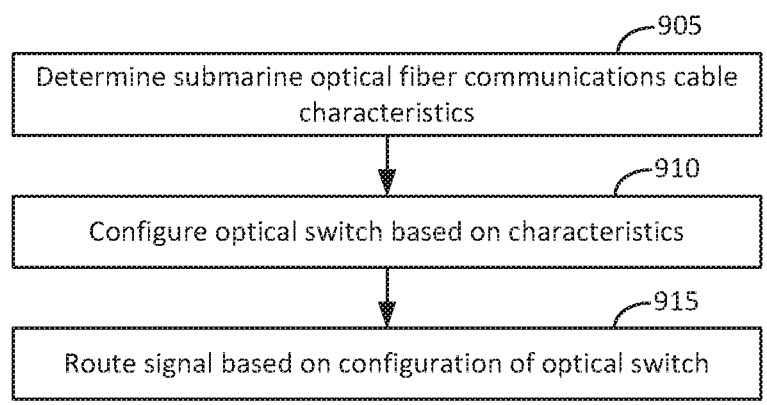
FIG. 9 illustrates a block diagram of configuring an optical switch of the configurable optical fiber communications system.

FIG. 9 illustrates a block diagram of configuring an optical switch of the configurable optical fiber communications system. In block 905, characteristics of a submarine optical fiber communications cable can be determined. In a simplified example, the optical fiber communications system might have twelve optical fibers with eight of the optical fibers carrying blue optical signals of the C band in one direction (e.g., the dominant direction) and four of the optical fibers carrying blue optical signals in another direction. This results in the data capacity of the dominant direction being higher than the data capacity of the other direction. However, if the other direction needs a higher data capacity, for example, if the amount of data in that direction has increased, then at block 910, an optical switch of the configurable optical fiber communications system can be adjusted to change its state. At block 915, this results in providing blue optical signals in the other direction. For example, as previously discussed, if optical switch 410 changes to a different configuration, then the direction that the blue optical signals is provided can be changed.

In some implementations, a server including one or more processors and memory can determine the characteristics of the submarine optical fiber communications cable and instruct the optical switches to change state. For example, a server in a datacenter can include instructions stored in its memory that can be executed by the processor to perform the techniques described herein. Commands instructing the optical switches of the submarine optical fiber communications cable to change their state can then be provided by being transmitted by the server.

Though the above example uses optical switch 410 to change the direction that blue optical signals are provided, in other examples, red optical signals can be changed instead. In another example, all C band optical signals can be passed-through similar to the red optical signals as discussed above, but L band optical signals can be reflected such that they are propagated through optical switch 410, or vice versa.

Additionally, many of the examples described herein detail east-to-west and west-to-east directions. These are simplified examples and any directions or orientations may be used.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A submarine optical fiber communications system configured to transmit optical signals within a first band of the electromagnetic spectrum dedicated for communication in a first direction, and to transmit optical signals within a second band of the electromagnetic spectrum dedicated for communication in a second direction, the first direction being different than the second direction, and the first band and the second band being different bands of an optical frequency range of the electromagnetic spectrum; and wherein the submarine optical fiber communications system includes at least a portion of a first optical fiber configured to carry optical signals within the first band of the electromagnetic spectrum dedicated for communication in the first direction, and at least the same portion of the first optical fiber is configured to carry optical signals within the second band of the electromagnetic spectrum dedicated for communication in the second direction.

2. The submarine optical fiber communications system of claim 1, comprising:

a first optical amplifier configured to receive a first optical signal within the first band and provide an amplified first optical signal in the first direction; and a second optical amplifier configured to receive a second optical signal within the second band and provide an amplified second optical signal in the second direction.

3. The submarine optical fiber communications system of claim 2, wherein the first optical amplifier includes a first amplification medium, the second optical amplifier includes a second amplification medium, the first and second amplification mediums being different.

4. The submarine optical fiber communications system of claim 1, wherein a portion of the first band of the electromagnetic spectrum dedicated for communication in the first direction is dynamically switchable to be dedicated for communication in the second direction based on a state of an optical switch included in the submarine optical fiber communications system.

5. The submarine optical fiber communications system of claim 1, wherein the submarine optical fiber communication system includes a second optical fiber configured to carry optical signals within the first band in the second direction, and the second optical fiber further configured to carry optical signals within the second band in the first direction.

6. The submarine optical fiber communications system of claim 1, wherein one of the first band or the second band corresponds to C band and the other corresponds to L band.

7. A method of carrying optical signals within a submarine optical fiber communications system, comprising:

transmitting a first optical signal within a first band of the electromagnetic spectrum dedicated for communication in a first direction; and transmitting a second optical signal within a second band of the electromagnetic spectrum dedicated for communication in a second direction, the first direction being different than the second direction, and the first band and the second band being different bands of an optical frequency range of the electromagnetic spectrum; and wherein the submarine optical fiber communications system includes at least a portion of a first optical fiber configured to carry optical signals within the first band of the electromagnetic spectrum dedicated for communication in the first direction, and at least the same portion of the first optical fiber is configured to carry optical signals within the second band of the electromagnetic spectrum dedicated for communication in the second direction.

8. The method of claim 7, wherein a portion of the first band of the electromagnetic spectrum dedicated for communication in the first direction is dynamically switchable to be dedicated for communication in the second direction based on a state of an optical switch included in the submarine optical fiber communications system.

9. The method of claim 7, further comprising:

transmitting a third optical signal within the first band in the second direction on a second optical fiber; and transmitting a fourth optical signal within the second band in the first direction on the second optical fiber.

10. The method of claim 7, wherein the transmitting includes amplifying the first optical signal and the second optical signal, the amplifying of the first optical signal using a first amplification medium, the amplifying of the second optical signal using a second amplification medium, the first and second amplification mediums being different.

11. A submarine optical fiber communications system configured to transmit a first optical signal within a first portion of the electromagnetic spectrum dedicated for communication in a first direction, and a second optical signal within a second portion of the electromagnetic spectrum dedicated for communication in the first direction or the second direction based on a state of an optical switch; and
  wherein the submarine optical fiber communications system includes at least a portion of an optical fiber configured to carry optical signals within the first band of the electromagnetic spectrum dedicated for communication in the first direction, and at least the same portion of the optical fiber is configured to carry optical signals within the second band of the electromagnetic spectrum dedicated for communication in the first direction or the second direction based on the state of the optical switch.

12. The submarine optical fiber communications system of claim 11, wherein the second optical signal propagates through the optical switch.

13. The submarine optical fiber communications system of claim 12, wherein the first optical signal does not propagate through the optical switch.

14. The submarine optical fiber communications system of claim 11, wherein one of the first portion or the second portion is a red portion of C band of the electromagnetic spectrum, and the other is a blue portion of C band of the electromagnetic spectrum.

15. The submarine optical fiber communications system of claim 11, wherein one of the first portion or the second portion is C band and the other portion is L band.

16. The submarine optical fiber communications system of claim 11, wherein the optical switch includes a first state and a second state, the optical switch in the first state configured to receive the second optical signal from a first terminal of a first optical splitter/combiner and provide the second optical signal to a second terminal of the first optical splitter/combiner, the optical switch in the second state configured to receive the second optical signal from a first terminal of a second optical splitter/combiner and provide the second optical signal to the second terminal of the first optical splitter/combiner.

17. A method of transmitting optical signals within a submarine optical fiber communications system, comprising:
  determining characteristics of the submarine optical fiber communications system;
  configuring a state of an optical switch of the submarine optical fiber communications system from a first state to a second state based on the determined characteristics; and
  adjusting a dedicated transmission direction of a first portion of the electromagnetic spectrum from a first direction dedicated for the first portion of the electromagnetic spectrum to a second direction based on the state of the optical switch.

18. The method of claim 17, wherein the characteristics include an increase in data in the second direction.

19. The method of claim 17, further comprising:
  transmitting optical signals within a second portion of the electromagnetic spectrum in the first direction, wherein the optical signals within the second portion are also transmitted in the first direction when the state of the optical switch is in the first state or the second state.

20. The method of claim 19, wherein one of the first portion or the second portion is a red portion of C band of the electromagnetic spectrum, and the other is a blue portion of C band of the electromagnetic spectrum.

* * * * *